Patented Oct. 11, 1927.

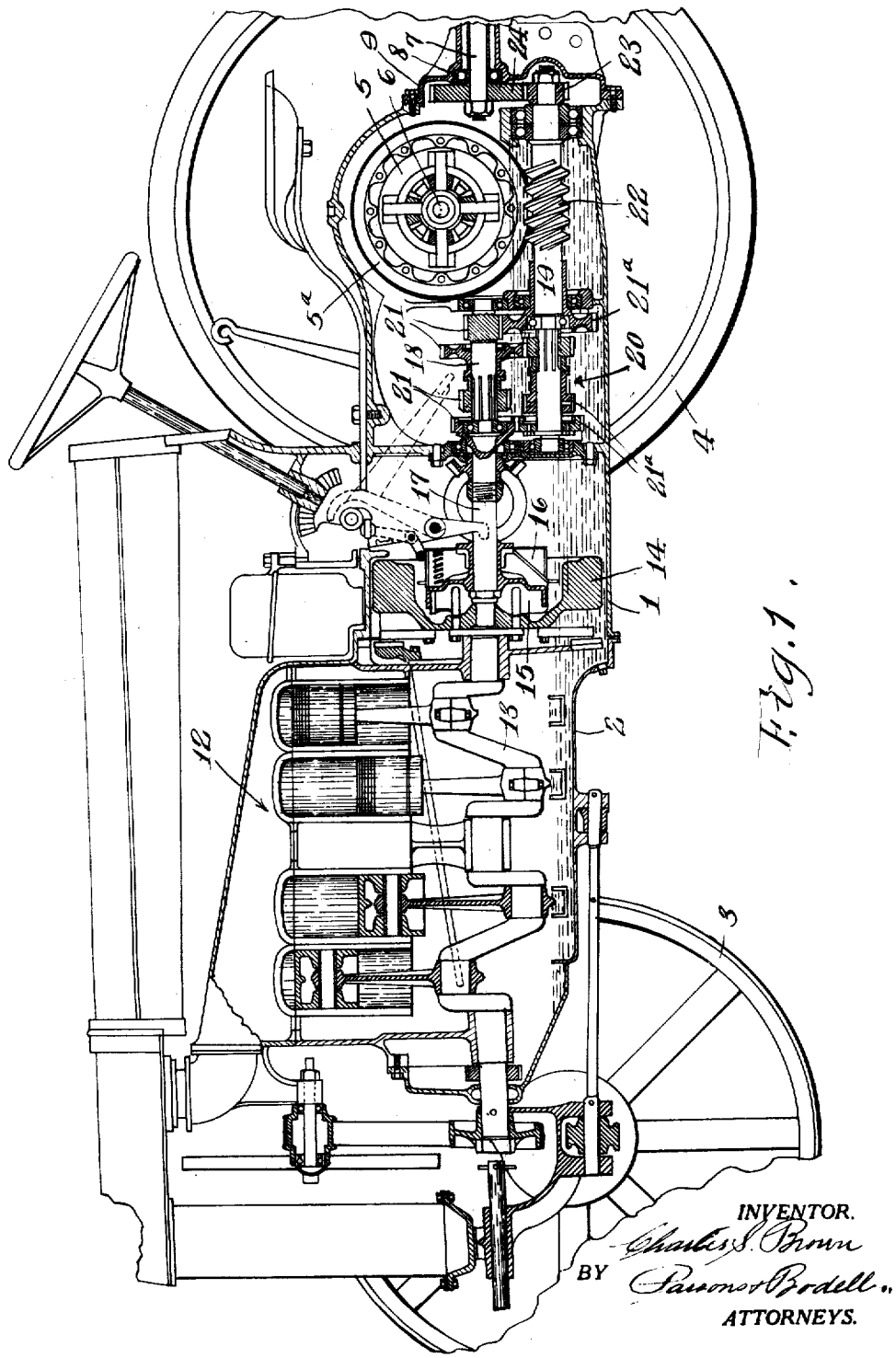

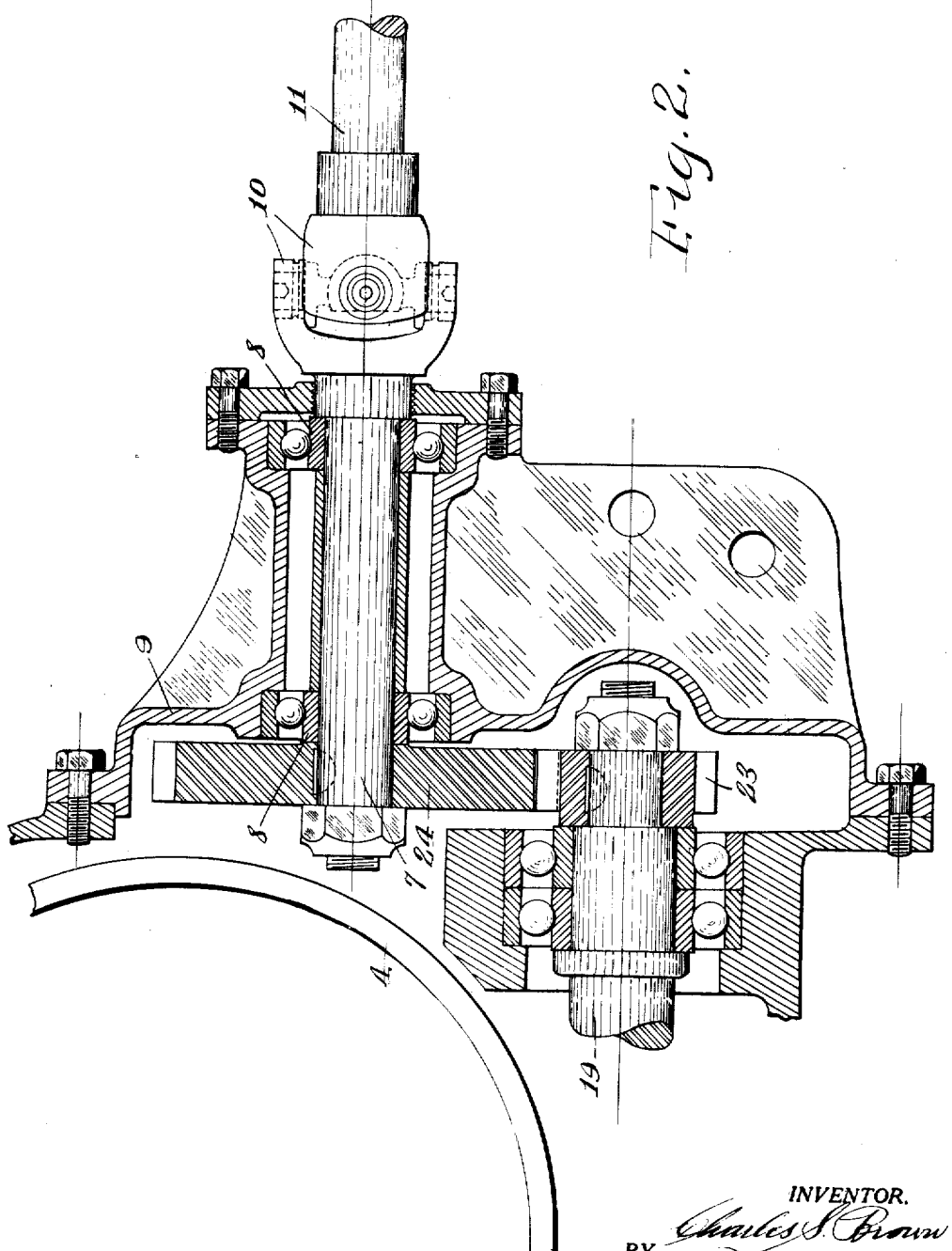

1,645,224

UNITED STATES PATENT OFFICE.

CHARLES S. BROWN, OF SYRACUSE, NEW YORK.

TRACTOR AND IMPLEMENT CONSTRUCTION.

Continuation of application Serial No. 245,205, filed July 16, 1918. This application filed July 29, 1925. Serial No. 46,776.

The present application is a continuation of an application filed by me July 16, 1918, Serial No. 245,205.

This invention has for its object a tractor and implement construction by which a machine having power driven mechanism as for instance, a mower having a mower knife, a binder etc. may be drawn by the tractor, and the mechanism thereof actuated by the power plant of the tractor instead of being actuated from the ground wheels of such machine. The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of a preferable form of my tractor.

Fig. 2 is an enlarged detail view of the driven member which actuates the movable parts of the machine being drawn by the tractor.

This tractor comprises generally, two driven elements independent of each other, a tractor wheel connected to one of said driven elements, the other of the driven elements being adapted to be connected to the movable parts of the machine being drawn by the tractor, a motor, power transmitting connections between the motor and the driven elements, the power transmitting connections preferably including a member common to or connected to both of said driven elements and also change speed gearing between the motor and said member so that both driven elements although independent of each other and driving different sets of mechanism are alike subject to the different speed changes.

I have here shown my invention as embodied in the Ford tractor in which the frame comprises a casting 1 for the gearing, and the engine base 2, the parts 1 and 2 supporting the axles for the front wheels 3 and the rear tractor or ground wheels 4, the latter being connected to a driven element comprising a differential gear 5 and the shaft sections, as the section 6, connected to the differential gearing and to the tractor wheels respectively.

7 is the second driven element which is here shown as a shaft journaled in a bearing 8 formed in the cover plate 9 secured to the rear end of the casing 1, the rear end of the shaft 7 being coupled by any suitable means as a universal joint 10 to a shaft 11 adapted to be connected to the mechanism of the machine being drawn, as a mower knife or other movable mechanism of any other agricultural machine which is now actuated from the ground wheels of such machine.

12 designates the motor or engine which may be of any suitable form, size and construction.

13 is the crank shaft of the engine; 14, the fly wheel connected to the crank shaft; 15, 16, the coacting clutch members which normally connect the drive shaft to the driven shaft 17 of the transmission gearing and which is controlled in its operation by a foot pedal or other member in any well known manner, the member 15 being mounted on the engine shaft and the member 16 on the shaft 17.

The power transmitting connections include the driving shaft 17 which is connected to the shiftable element or clutch 16, the shaft 18 journaled in the casing 1, the shaft 19 and worm thereon, change speed gearing 20 between the shafts 18 and 19, and motion transmitting means between the worm shaft 19 and the shaft 7.

This change speed gearing may be of any well known form, size and construction and operable in any well known manner, it including gears 21 mounted upon the shaft 18 and gears 21ª mounted upon a shaft which is parallel to the shaft 18. Some of these gears are shiftable in any well known manner to vary the speed of the shaft 19.

The shaft 19 is here shown as provided with a worm 22 meshing with a worm gear associated with the driving element 5ª of the differential gearing. It is also provided with an additional gear 23 meshing with a gear 24 mounted within the casing 1 on the inner end of the shaft 7. As before stated, my invention is embodied in the Ford tractor and is adapted thereto by mounting the plate 9 on the rear of the casing 1 of the Ford tractor and substituting the shaft 19 having means for mounting the gear 23 thereon for the worm shaft now present in such tractors.

The speed ratio between the shaft 19 and the driven shaft 7 may be varied by changing the sizes of the gears 23, 24.

In operation, the tractor is connected to an agricultural machine to draw the same and at the same time the shaft 11 is coupled at its rear end to the movable mechanism of the machine being drawn, said machine having suitable means for connecting and disconnecting at will the shaft 11 from said mechanism.

What I claim is:

A tractor comprising a driving axle including a differential gear ring, ground wheels mounted on the ends of the driving axle and supporting the latter, a power take off shaft arranged in rear of the wheel supported axle, a motor, power transmitting connections between the motor and said gear ring, and said power take off shaft comprising a shaft 19 having a gear meshing with the gear ring and being also connected to the power take off shaft and change speed gearing between the motor and said shaft 19 differential.

In testimony whereof, I have hereunto signed my name, at Syracuse, in the county of Onondaga, and State of New York, this 16th day of June, 1925.

CHAS. S. BROWN.

The speed ratio between the shaft 19 and the driven shaft 7 may be varied by changing the sizes of the gears 23, 24.

In operation, the tractor is connected to an agricultural machine to draw the same and at the same time the shaft 11 is coupled at its rear end to the movable mechanism of the machine being drawn, said machine having suitable means for connecting and disconnecting at will the shaft 11 from said mechanism.

What I claim is:

A tractor comprising a driving axle including a differential gear ring, ground wheels mounted on the ends of the driving axle and supporting the latter, a power take off shaft arranged in rear of the wheel supported axle, a motor, power transmitting connections between the motor and said gear ring, and said power take off shaft comprising a shaft 19 having a gear meshing with the gear ring and being also connected to the power take off shaft and change speed gearing between the motor and said shaft 19 differential.

In testimony whereof, I have hereunto signed my name, at Syracuse, in the county of Onondaga, and State of New York, this 16th day of June, 1925.

CHAS. S. BROWN.

CERTIFICATE OF CORRECTION.

Patent No. 1,645,224.  Granted October 11, 1927, to

CHARLES S. BROWN.

It is hereby certified that error appears in the printed specification of the above numbered patent requiring correction as follows: Page 2, line 25, in claim strike out the word "differential"; and that the said Letters Patent should be read with this correction therein that the same may conform to the record of the case in the Patent Office.

Signed and sealed this 1st day of November, A. D. 1927.

M. J. Moore,
Acting Commissioner of Patents.

Seal.

CERTIFICATE OF CORRECTION.

Patent No. 1,645,224.  Granted October 11, 1927, to

CHARLES S. BROWN.

It is hereby certified that error appears in the printed specification of the above numbered patent requiring correction as follows: Page 2, line 25, in claim strike out the word "differential"; and that the said Letters Patent should be read with this correction therein that the same may conform to the record of the case in the Patent Office.

Signed and sealed this 1st day of November, A. D. 1927.

Seal.

M. J. Moore,
Acting Commissioner of Patents.